March 25, 1958 R. G. EASLEY 2,828,029
BOAT TRAILER
Filed Jan. 4, 1954 2 Sheets-Sheet 1
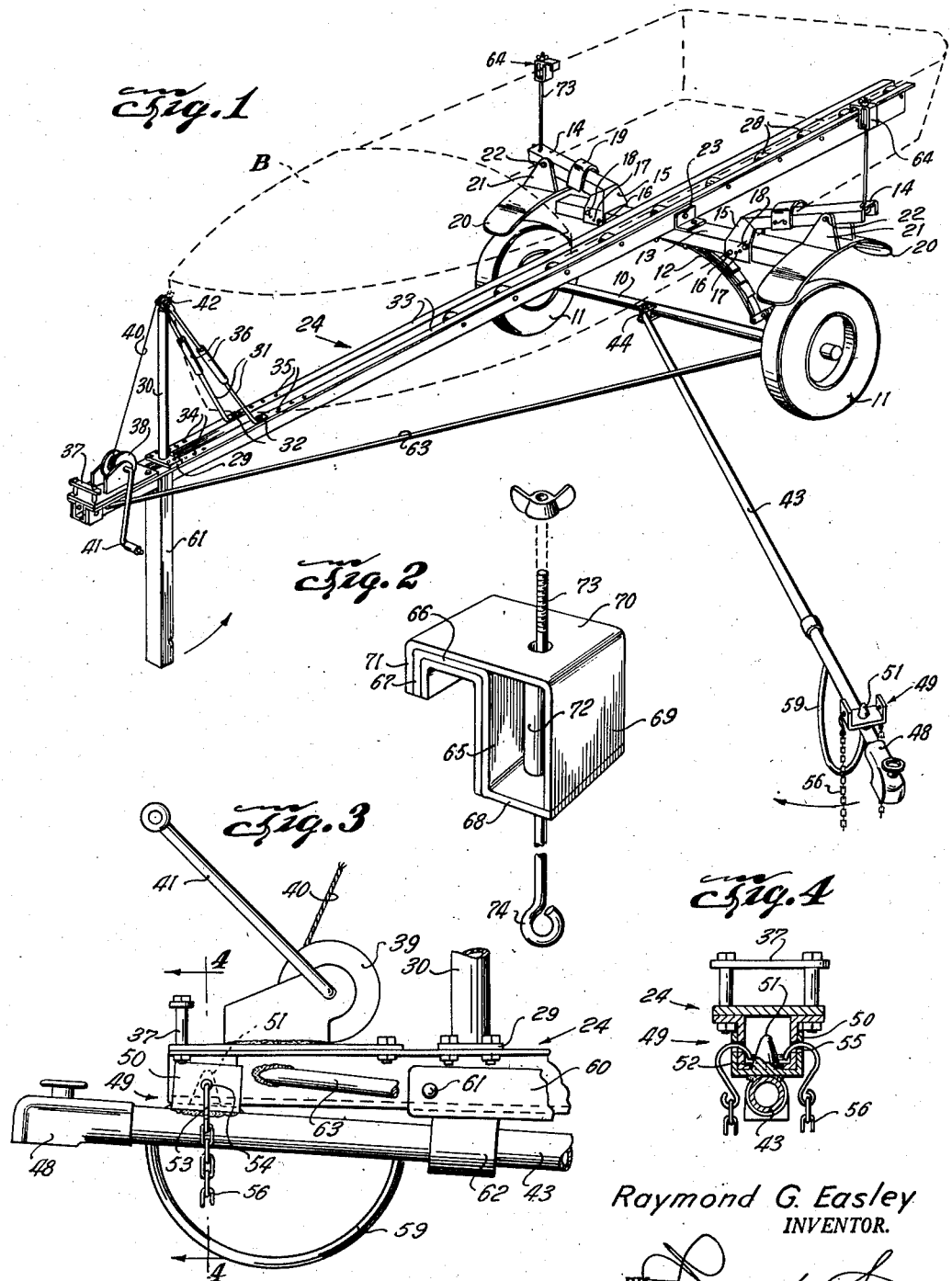
Raymond G. Easley
INVENTOR.
BY
ATTORNEY March 25, 1958 R. G. EASLEY 2,828,029
BOAT TRAILER
Filed Jan. 4, 1954 2 Sheets-Sheet 2
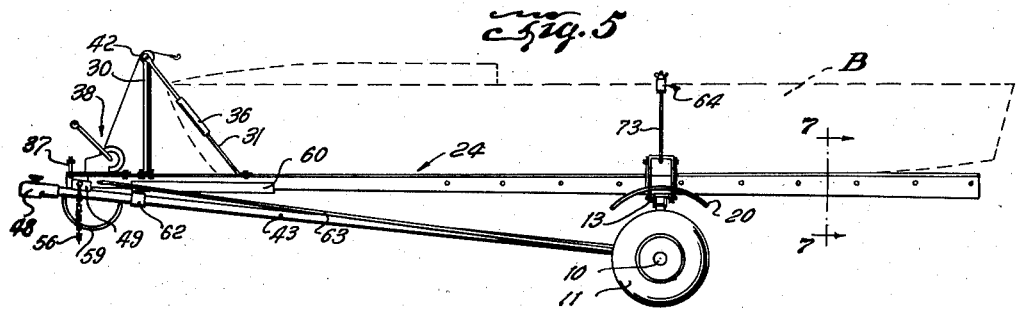
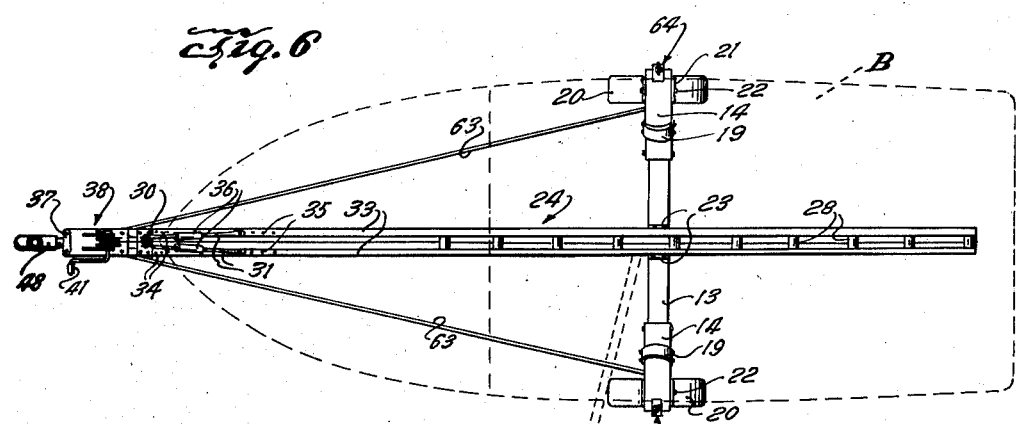
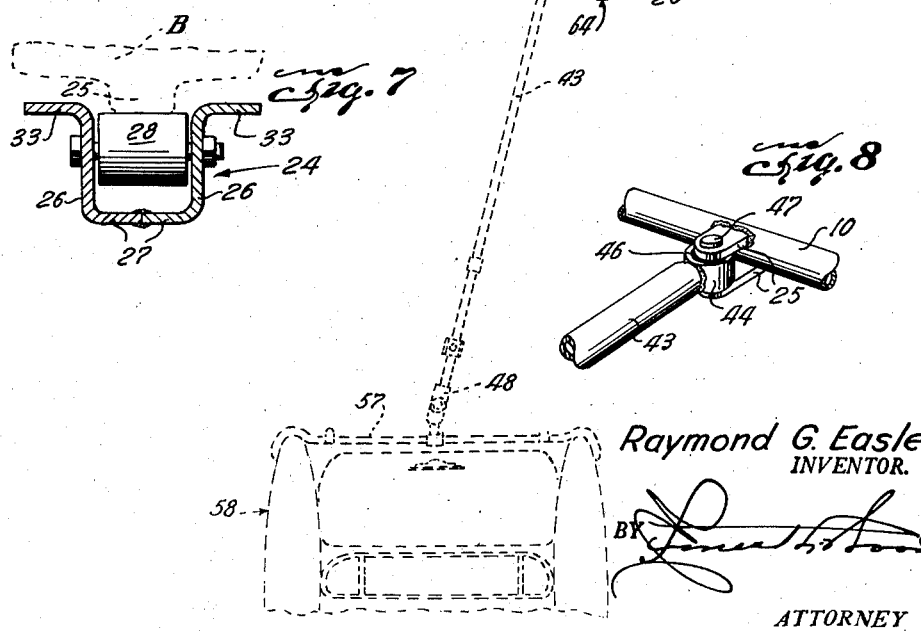
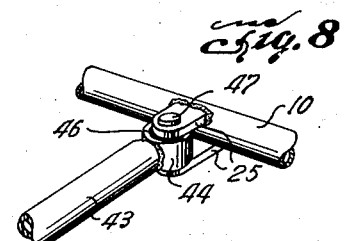
Raymond G. Easley
INVENTOR.
BY
ATTORNEY 2,828,029

BOAT TRAILER

Raymond G. Easley, Dallas, Tex.

Application January 4, 1954, Serial No. 402,040

4 Claims. (Cl. 214—84)

This invention relates to boat trailers.

It is the principal object of the invention to provide a boat trailer in which a keel beam is made stationary with a wheeled frame which latter is rotatable to a variety of angles in relation to the end of a towing bar so that the keel beam may be disposed to load and unload a boat at any desired angle in relation to the shore line irrespective of the position of the towing vehicle. By virtue of such an arrangement, a boat may be loaded onto the trailer by one person without difficulty, even against a strong wind, tending to force and keep the boat parallel with the shore line.

Another object of the invention is to provide a boat trailer having a keel beam rotatable independently of the towing vehicle and tiltable to facilitate launching of a boat supported thereon and to enable the rear end of the beam to be disposed under the prow of the boat while in the water or on shore preparatory to loading the boat onto the trailer.

Still another object of the invention is to provide means for aligning the keel beam with the towing bar for traveling, said means also being effective to transfer the draft load from the towing bar to the keel beam to relieve strain on the pivotal connection between the towing bar and wheeled frame.

Other objects will become manifest as the description proceeds when considered with the annexed drawing, wherein:

Figure 1 is a perspective view of the trailer showing the keel beam at an angle to the towing bar.

Figure 2 is a detail perspective view of one of the hold-down clamps.

Figure 3 is a fragmentary elevational view of the trailer showing the keel beam and towing bar in position for traveling.

Figure 4 is a transverse sectional view taken on line 4—4 of Figure 3.

Figure 5 is a side elevational view of the boat trailer.

Figure 6 is a top plan view thereof, showing in dotted lines the towing bar and towing vehicle at an angle to the trailer.

Figure 7 is a sectional view taken on line 7—7 of Figure 6, and

Figure 8 is a fragmentary perspective view showing the pivotal connection between the towing bar and trailer axle.

Continuing with a more detailed description of the drawing, reference numeral 10 denotes the axle of the trailer on each end of which is mounted a wheel 11. Connected at each end adjacent an end of the axle 10 is a bowed spring 12 and mounted on this spring is an inverted channel cross-member 13 which lies parallel with the axle 10.

A cradle for a boat B is formed by a pair of channel members 14 having depending leg portions 15 whose lower ends are bifurcated to straddle the cross-member 13 and to which it is pivoted by means of a bolt 16 and made adjustable by a series of bolt receiving holes 17 radially disposed in relation to the pivot bolt 16 and in which a bolt 18 is selectively inserted to hold the cradle members 14 in adjusted angular positions. A protective pad 19 of rubber or other suitable material is affixed to each of the cradle members 14 to prevent direct contact of the boat hull with the cradle members.

Supported from the outer end of each of the cradle members 14 is a fender 20. A pair of parallel plates 21 is affixed to each fender 20, between which the outer end of the cradle member is received and pivotally suspended by a bolt 22 so that the fenders may be kept in the same plane while the cradle members 14 are moved to different positions to accommodate boats of different sizes.

Affixed to the midsection of the cross-member 13 by means of cleats 23 is a beam 24, herein referred to as a "keel beam" inasmuch as it supports the boat B by its keel 25 (Figure 7). The keel beam is made up of two parallel Z bars 26 whose lower flanges 27 are in confronting relationship and are welded together, as shown. Between the two Z bars is pivoted a plurality of longitudinally spaced rollers 28 upon which rests the keel 25 of the boat and which facilitates loading and unloading of the boat. The rear end of the keel beam extends well beyond the axle 10 of the trailer so that it may be lowered to a position below the prow of the boat in loading and unloading.

At the forward end of the keel beam is a transverse plate 29 (Figure 3) on which is affixed the lower end of an upright 30. Affixed to the top of the upright 30 are the ends of a pair of rods 31 which extend downwardly where their lower ends are secured by bolts 32 (Figure 1) to the oppositely extending upper flanges 33 of the keel beam 27. It will be observed that a series of longitudinally spaced holes 34 are provided in the flanges 33 for longitudinal adjustment of the upright mounting plate 29 and that a like number of holes 35 are provided in these flanges for corresponding adjustment of the angular rods 31. These adjustments are necessary to accommodate boats of different lengths, the prow of the boat being disposed between the angular rods 31, in the manner shown. The rods each has a rubber tube 36 thereon to protect the finish of the boat against defacement.

Mounted on the extreme forward end of the keel beam 24 is a handle 37 and between the handle and the upright 30 there is mounted a conventional ratchet winch 38, the sheave 39 of which has a cable 40 wound thereon whose free end is engageable with the prow of the boat B so that the boat may be lowered down the inclined keel beam and drawn upwardly onto the beam by rotation of the crank 41, the cable 40 passing upwardly and over a pulley 42 mounted in the top of the upright 30.

A towing bar 43 has affixed to its rear end a sleeve 44 which is receivable between ears 45 (Figure 8) welded to the midsection of the axle 10. A rubber bushing 46 within the sleeve 44 surrounds the coupling pin 47 and allows a limited amount of torque in the towing bar 43. The forward end of the towing bar 43 carries the female section 48 of a conventional trailer hitch.

Spaced rearwardly of the hitch member 48 is a U-shaped receptacle 49 (Figures 3 and 4) between whose side flanges 50 is received the forward end of the keel beam 24, in the manner shown. A tapered post 51 is affixed to the base of the receptacle 49 between its flanges and is received in an opening 52 (Figure 4), in the bottom of the keel beam when the latter is set down into the receptacle 49, the taper of the post guiding the beam into position, permitted by the flexibility afforded by the rubber bushing 46 in the coupling between the towing bar 43 and the axle 10. When in place, the keel beam is secured against release from the receptacle 49 by hooks 53, inserted into holes 54 in the side flanges 50 of the receptacle and which extend through matching holes 55 in the keel beam. The hooks 53 are attached to the ends of a pair of safety chains 56 which are usually conventional trailer equipment, the opposite ends of the chains being connected to opposite ends of the bumper 57 of a towing vehicle 58 (Figure 6).

A support for the front end of the towing bar 43, while it is disconnected from the towing vehicle, is in the form of an arcuated rod 59, one end of which is welded to the underside of the bar 43 adjacent its forward end while the opposite end of the rod is welded at a point spaced rearwardly of the forward end of the bar.

A support for the forward end of the keel beam 24, when it is elevated to load or unload a boat, is in the form of a channel member 60, pivoted at 61 to the sides of the keel beam adjacent its forward end and is lowered into the position shown in Figure 1. When not in use, the channel member 60 is raised into parallelism with the beam 24 so that its side flanges will engage frictionally with the sides of the beam, as shown in Figure 5. A protective sleeve 62 of rubber or other suitable material surrounds the towing bar 43, against which the supporting member or leg 60 sometimes bears to prevent rattles or frictional wear between the supporting leg and towing bar.

A pair of brace rods 63 are affixed at their forward ends to opposite sides of the keel beam 24 near the forward end of the latter and at their rear ends to the ends of the axle 10.

The fact that the forward end of the keel beam 24 is connected by means of the tapered post 51, which is stationary with the towing bar 43, relieves the strain on the towing bar and actually transfers the pulling force from the towing bar to the keel beam which becomes the means by which the trailer is drawn by the tow car while traveling and avoids torque strain on the frame. Side draft is precluded by the angular brace rods 63.

In mounting a boat on the trailer and assuming that the boat is in the water parallel with the shore line; the tow car 58 is backed toward the water a distance sufficient for the keel beam 24 to be swung into axial alignment with the boat keel. In some cases, it may be necessary for the wheels of the trailer to be backed into the water. This is no consequence since the wheel bearings are watertight. The hooks are then removed from their positions in the holes 54 and 55 of the receptacle 50 and beam 24, respectively, and the end of the beam is lifted from the receptacle and manually swung into a position where the rear end of the beam will extend under the prow of the boat. It is to be observed that the trailer axle, being stationary with the beam, will assume a position transverse to the longitudinal axis of the boat when the beam is in axial alignment therewith. Also, in manipulating the beam 24 into position, the towing bar 43 will follow the movements of the trailer axle and remain, if desired, attached to the towing vehicle. After the beam is in position, the supporting leg 60 is lowered to support the elevated forward end of the beam and the end of cable 40 is connected to the prow of the boat. By operating the winch 38, the boat is easily drawn onto the trollers 28 of the beam until the boat prow is brought up between the angular rods 31.

Hold-down clamps 64 (Figure 2) are attached to each side of the boat. These clamps each consist of a metal strap bent to form a vertical portion 65, a horizontal portion 66 adapted to overlie the gunwale of the boat, a lip 67 engageable with the inside of the gunwale and a horizontal portion 68 at its lower end which is welded to the lower end of a vertical portion 69 of a second metal strap, the latter having a horizontal portion 70 which extends parallel with the horizontal portion 66 of the first strap and is further provided with a lip or hook portion 71, parallel with the portion 67 of the companion strap to reinforce the same. The vertical portions 65 and 69 of the straps are spaced apart to define a space occupied by a tube 72 whose upper and lower ends are welded to the horizontal portions 68 and 70, respectively, of the straps. Through this tube extends a threaded rod 73 whose lower end 74 is looped to engage in an aperture in a cradle member 14 of the trailer frame. A padding 75 of rubber is cemented to the portions 65, 66 and 67 of that part of the clamp which engages the boat gunwale to protect the same against wear.

In launching a boat, the operations for the loading of a boat are reversed. It is evident however that the description has purposely been given to cover a condition which is not always encountered, that of loading a boat against an oncoming or cross-wind tending to force the boat into a position parallel with the shore line; a position in which it is impossible to load a boat onto the conventional boat trailer. Under less difficult conditions, the operation of loading and unloading is not unlike that described. When a boat can be easily held in a position at right angles to the short line it is not necessary to swing the keel beam. However, it is manipulated to set the rear end under the boat prow so that the wind may operate to draw the boat onto the beam.

Manifestly, the construction as shown and described is capable of some modification and such modification as may be construed to fall within the scope and meaning of the appended claims is also considered to be within the spirit and intent of the invention.

What is claimed is:

1. A boat trailer comprising an axle having wheels thereon, a towing bar pivoted at one end to the axle intermediate its ends, a towing hitch on the opposite end of the towing bar, a cross member supported above and parallel to the axle, a boat supporting keel beam affixed to the midsection of the cross member and extending fore and aft thereof, the forward end of the towing bar extending beyond the adjacent end of the keel beam in one position of the towing bar, the keel beam being tiltable in a vertical plane and rotatable in a horizontal plane about the pivotal junction between the towing bar and the axle, means securing the keel beam and the towing bar in said one position of the towing bar, means supported on the forward end of the keel beam for pulling a boat onto the keel beam and for controlling its descent in unloading it therefrom and a receptacle carried by the towing bar adjacent its forward end and having opposed flanges between which is received the forward end of the keel beam, the flanges and the keel beam having matching apertures, and latching means receivable in the matching apertures for holding the keel beam against release from the receptacle.

2. The structure of claim 1, and an upright mounted for adjustment longitudinally on the keel beam adjacent its forward end and a pair of downwardly divergent rods affixed at their upper ends to the top of the upright and attached at their lower ends to the keel beam for longitudinal adjustment thereon, the rods receiving therebetween the prow of a boat supported on the keel beam.

3. In a boat trailer for loading and unloading a boat at selected angular positions with respect to a towing vehicle, a frame comprising an axle having wheels thereon, a towing bar connected at one end to said towing vehicle and pivoted at its opposite end to said axle on a vertical axis at its mid-section for swinging displacement in the same horizontal plane with said axle, a cross-member supported above and parallel with said axle, a boat supporting keel beam traversing said cross-member at its midsection and affixed thereto and operable to oscillate said frame independently of said towing bar about the pivotal axis of the latter, and means carried jointly by said keel beam and said towing bar adjacent their forward ends cooperating to hold said keel beam and towing bar against relative displacement, an upright having a pulley journaled in its upper end, a pair of inclined, downwardly divergent rods affixed at their upper ends to the upper end of said upright and at their lower ends to said keel beam and engaging one on each side of the prow of a boat on said keel beam to hold the same against lateral displacement thereon, a winch on said keel beam and a cable wound on said winch and engageable with the prow of said boat over said pulley to pull said boat onto and to lower the same from said keel beam when said winch is actuated.

4. The structure of claim 3, and means to effect adjustment of the upright and the inclined rods longitudinally on the keel beam.

References Cited in the file of this patent

UNITED STATES PATENTS

| | | |
|---|---|---|
| 1,284,316 | Gotchall | Nov. 12, 1918 |
| 2,442,248 | Sampsell | May 25, 1948 |
| 2,485,793 | Vassar | Oct. 25, 1949 |
| 2,488,805 | Clark et al. | Nov. 22, 1949 |
| 2,516,574 | Holly | July 25, 1950 |
| 2,586,485 | Schroeder | Feb. 19, 1952 |
| 2,608,314 | Krider | Aug. 26, 1952 |
| 2,691,534 | Sampsell | Oct. 12, 1954 |
| 2,708,045 | Shontz | May 10, 1955 |
| 2,711,259 | Jones | June 21, 1955 |

FOREIGN PATENTS

| | | |
|---|---|---|
| 519,393 | France | Jan. 22, 1921 |